United States Patent
Hauville

(10) Patent No.: US 7,300,483 B2
(45) Date of Patent: Nov. 27, 2007

(54) MODULAR FILTRATION ASSEMBLY

(75) Inventor: Francois P. Hauville, North Andover, MA (US)

(73) Assignee: FIPAK Research and Development Company, North Andover, MA (US)

( * ) Notice: Subject to any disclaimer, the term of this patent is extended or adjusted under 35 U.S.C. 154(b) by 109 days.

(21) Appl. No.: 10/785,200

(22) Filed: Feb. 24, 2004

(65) Prior Publication Data

US 2005/0184005 A1    Aug. 25, 2005

(51) Int. Cl.
*B01D 50/00* (2006.01)
*B01D 29/52* (2006.01)
*B01D 25/02* (2006.01)
*B01D 25/00* (2006.01)

(52) U.S. Cl. ............... 55/315; 55/318; 210/235; 210/346; 210/341

(58) Field of Classification Search .......... 210/235, 210/346, 323.1, 335, 435, 446; 55/315, 318
See application file for complete search history.

(56) References Cited

U.S. PATENT DOCUMENTS

| | | | |
|---|---|---|---|
| 2,143,270 A | * | 1/1939 | Huber ............... 210/323.1 |
| 4,159,250 A | * | 6/1979 | Schnell ............... 210/232 |
| 5,292,432 A | * | 3/1994 | Jainek et al. ........ 210/168 |
| 2002/0074277 A1 | | 6/2002 | Thomassen |

FOREIGN PATENT DOCUMENTS

| | | |
|---|---|---|
| DE | 91 02 485 U1 | 5/1991 |
| DE | 101 40 081 A1 | 3/2003 |
| FR | 2 803 534 A1 | 7/2001 |

\* cited by examiner

*Primary Examiner*—Krishnan S. Menon
(74) *Attorney, Agent, or Firm*—Pandiscio & Pandiscio

(57) ABSTRACT

A modular filtration assembly for filtration of fluids, the capacity of the assembly depending upon the selected number of filtration modules included in the assembly. Each of the modules is made up of two identical housing members connected together in inverse, head-to-tail configuration and providing for inflow and outflow of fluid to and from a filter unit disposed in a recess formed by the two housing members. A housing inlet and housing outlet serve the function of assembly inlet and assembly outlet when the modules are assembled to one another to form the filtration assembly, providing for modularity and affording flexibility of capacity of the assembly.

16 Claims, 9 Drawing Sheets

MODULAR FILTRATION ASSEMBLY

FIELD OF THE INVENTION

This invention relates to the filtration of fluids in general, and more particularly to a novel filtration assembly made up of a plurality of identical filtration modules, whereby to simplify the manufacturing process, and adapted to be connected together so as to form an economical filtration assembly of a selected size and capacity.

BACKGROUND OF THE INVENTION

It is known to provide filtration assemblies adapted to receive cassette-type filter units. However, such assemblies are generally monolithic, cumbersome, heavy and costly to manufacture. Such assemblies also lack the flexibility of variable fluid output because their pre-set design is not modular. Their capacity depends on the design of a base model, which is determined by the initial output requirement and is fixed once and for all. Thus, manufacturers lack a product whose fluid handling capacity can be custom-configured to the unique needs of each user or application, and users lack a flexible product which is adaptable to their changing needs, such as, for example, when there are changes in the size of the structures which are to have their contents filtered, or changes in the fluid volumes which need to be filtered, or the constant change of variables found in the exhaust of toxins in air or water, etc.

Among other things, consideration must be given to several issues relating to the filtration of a fluid. More particularly, for many types of filters, each filter unit can only handle a certain quantity of fluid before the capacity of the filter unit is reached. Thus, in order to handle a larger volume of fluid, more filter units may need to be provided. However, if the filter units are disposed serially, such as that shown in FIG. 1, each additional filter unit F adds to fluid resistance, thereby necessitating larger fans or pumps to force the fluid through the series of filter units. On the other hand, if the filter units F are disposed in parallel, such as that shown in FIG. 2, fluid resistance may be kept down but the overall size of the filter assembly grows, sometimes to impractical proportions. Thus, in many cases the use of serial or parallel filter configurations is impractical for the task at hand.

There is thus a need for a novel filtration assembly modular in nature, such that a single basic design can be easily modified in assembly to suit a particular user's needs, and can subsequently be modified by the user in accordance with changes in capacity requirements.

And there is a need for an improved construction design that simplifies the manufacturing process and allows cost reduction.

And there is a need for a novel filter assembly which provides a new and improved filter configuration.

SUMMARY OF THE INVENTION

Accordingly, an object of the present invention is to provide a novel filtration assembly adapted for assembly so as to provide a selected output, and adapted, once in use, for easy modification so as to provide for a changed output requirement.

Another object of the present invention is to provide a filtration assembly which is adapted for simple, low-cost, mass production, and which includes one or more identical filtration modules, each having an input collection chamber and an output collection chamber for the fluids to be treated, the filtration assembly including a selected number of the identical filtration modules, each filtration module including a filter unit placed within the filtration module, and releasably retained in the module.

A further object of the present invention is to provide a modular filtration assembly of reduced cost, size, weight, maintenance and set-up, the output of which is determined by a selected number of identical filtration modules, each of the modules being made up of two identical, interconnected L-shaped housing members, arranged in a reversed, head-to-tail configuration, between which are placed one or more mobile cassette-type filter units. One of the module housing members directs the input of the fluid to be treated towards the filter unit, and the other module housing member directs the output of the treated fluid from the filter unit. Each of the housing members includes two openings, each adapted to flow input and output fluids of each filtration module.

With the above and other objects in view, a feature of the invention is the provision of a low-cost, mass production filtration assembly of minimum size and weight, and reduced set-up and maintenance.

A further feature of the invention is the provision of such a filtration assembly which includes a selected number of identical filtration modules, each including two identical housing members connectable to one another in a reverse, head-to-tail arrangement, with each housing member having two openings for the fluid being filtered.

In accordance with a further feature of the invention, there is provided a fluid filtration assembly comprising at least one filtration module, the module comprising first and second identical housing members connectable together in a reverse, head-to-tail arrangement so as to form a recess adapted to receive a filter unit, each of the housing members being provided with a collection chamber having a pair of openings aligned with each other, and a wall portion extending outwardly from the collection chamber and defining one wall of the aforementioned filter recess when the two identical housing members are connected together, the one wall being spaced from the filter unit so as to form a filter input chamber or a filter output chamber (depending on the direction of fluid flow within the fluid filtration module), and wherein the two openings are each adapted to serve as a fluid inlet, the walls permitting fluid flow therebetween and through the filter unit, and the two openings each being further adapted to serve as a fluid outlet, depending on the direction of fluid flow within the fluid filtration module.

In accordance with a still further feature of the invention, there is provided a fluid filtration assembly comprising at least one filtration module, the module comprising a first housing member comprising a first collection chamber in communication with a first wall extending therefrom, the first housing member having a first fluid inlet and a first fluid outlet, respectively, in opposed walls of the first collection chamber and in alignment with each other; a second housing member comprising a second collection chamber in communication with a second wall extending therefrom, the second housing member having a second fluid inlet and a second fluid outlet, respectively, in opposed walls of the second collection chamber and in alignment with each other; the first and second collection chambers and the first and second walls defining a recess for receiving and retaining a filter unit, wherein one of the fluid inlets is open to receive fluid flow and one of the fluid outlets is open to discharge filtered fluid, and wherein the received fluid flows through the fluid inlet, one of the collection chambers, along one of the walls, through the filter, along the other of the walls, through the other of the collection chambers, and out of the module through the fluid outlet.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 4A is a top plan view of the module and filter unit of FIG. 4;

DETAILED DESCRIPTION OF THE PREFERRED EMBODIMENTS

Figure 1:
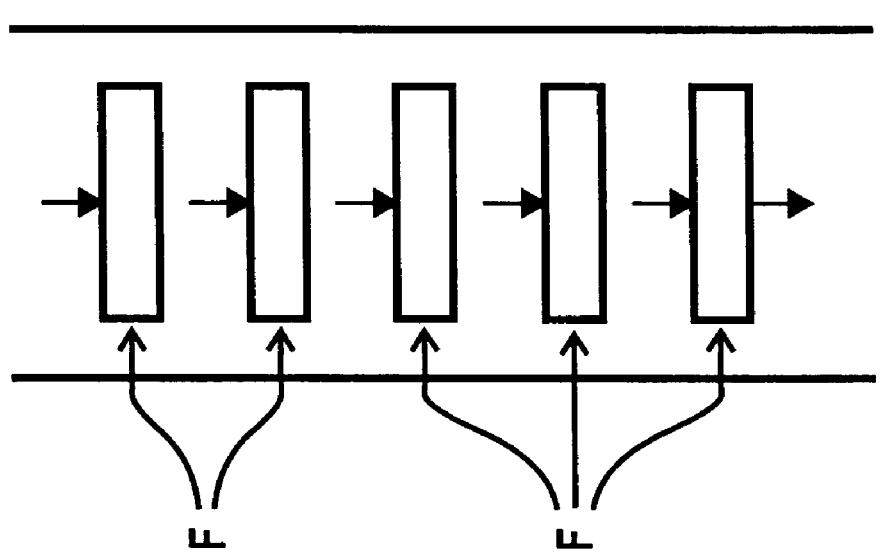
FIG. 1 is a schematic view showing a plurality of filter elements arranged in series.
Figure 2:
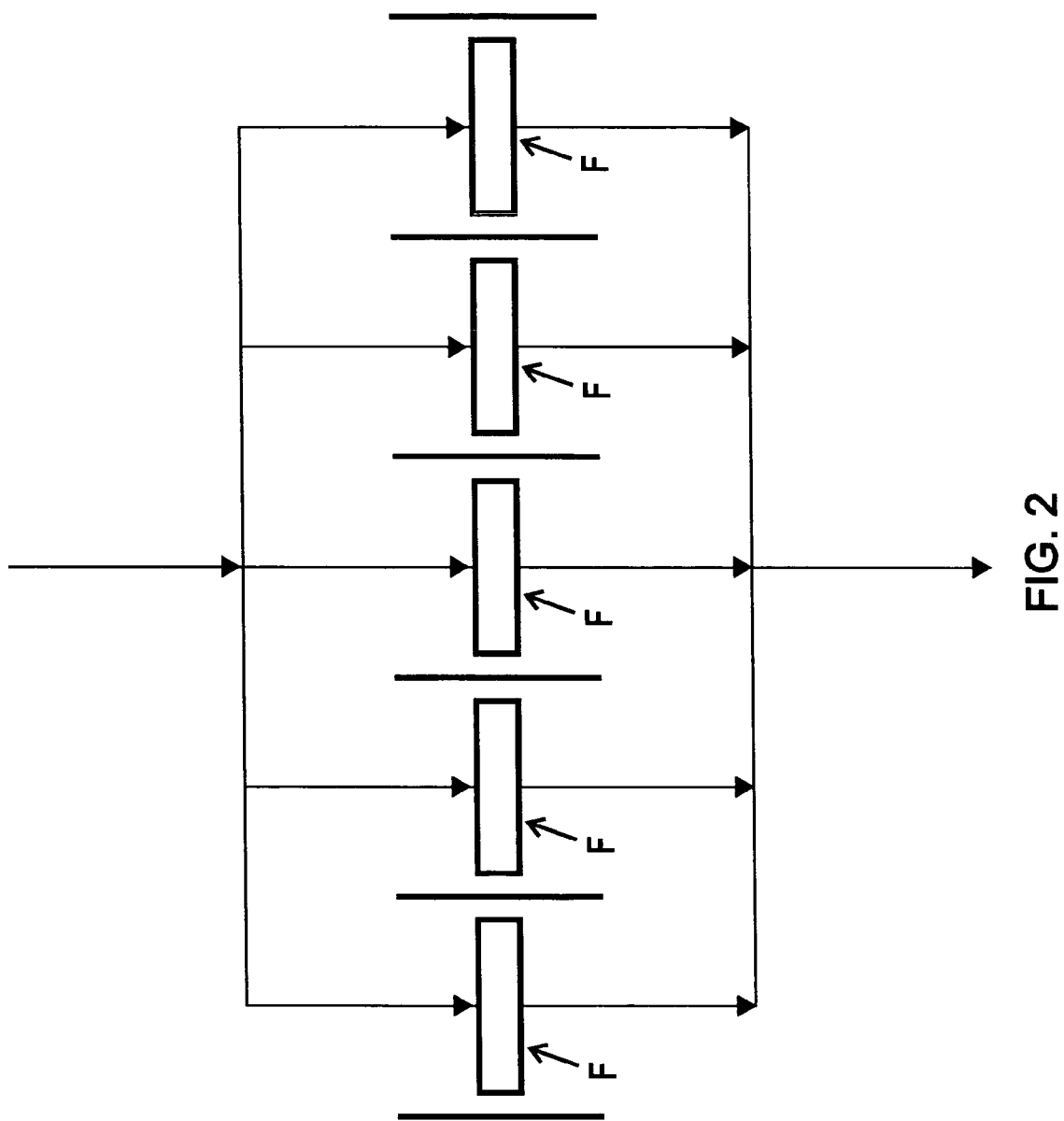
FIG. 2 is a schematic view showing a plurality of filter elements arranged in parallel.

Referring to FIGS. 3, 3A, 4, 4A, 5 and 5A, it will be seen that a housing member A includes a wall 2 and a collection chamber 3. The wall 2 is provided with seal members 1 (FIG. 3) which project out of the plane of the wall so as to facilitate forming a filter input chamber 20, or a filter output chamber 20 (FIGS. 4A and 5A), depending on the direction of air flow. The collection chamber 3 is provided with a first opening 4 and a second opening 8 aligned with the first opening 4. Collection chamber 3 also comprises a third opening 22 adjacent wall 2, whereby fluid can flow between collection chambers 3 and filter input chambers 20 and fluid output chambers 20.

As is shown in FIGS. 4, 4A, 5 and 5A, a pair of identical housing members A are adapted to be connected together in an inverse, head-to-tail configuration, so as to form a filtration module 15 having a recess 13 configured and sized to receive at least one filter unit 6. When a filter unit 6 is disposed in recess 13, wall 2 and seal members 1 will, in conjunction with the adjacent filter unit 6, form a filter input chamber 20, or a filter output chamber 20, depending on the direction of air flow. Each module 15 may be provided with one or more straps 24 and clamp devices 7 to hold the housing members A together and the filter units 6 securely in the recesses 13. Each housing member A may further be provided with a spring, such as leaf spring 5, for spreading the various elements apart when straps 24 and clamp devices 7 are released, e.g., such as when needed to remove a filter unit from the module.

Significantly, each filtration module 15 is formed by two identical housing members A arranged in an inverse, head-to-tail configuration. Thus, only one configuration of housing member A needs to be fabricated in order to form a complete filtration module 15 and, indeed, in order to form a large assembly 14 (FIGS. 6 and 6A) of filtration modules 15. As a result, manufacturing and inventory issues are greatly simplified and costs dramatically reduced.

Figure 4:
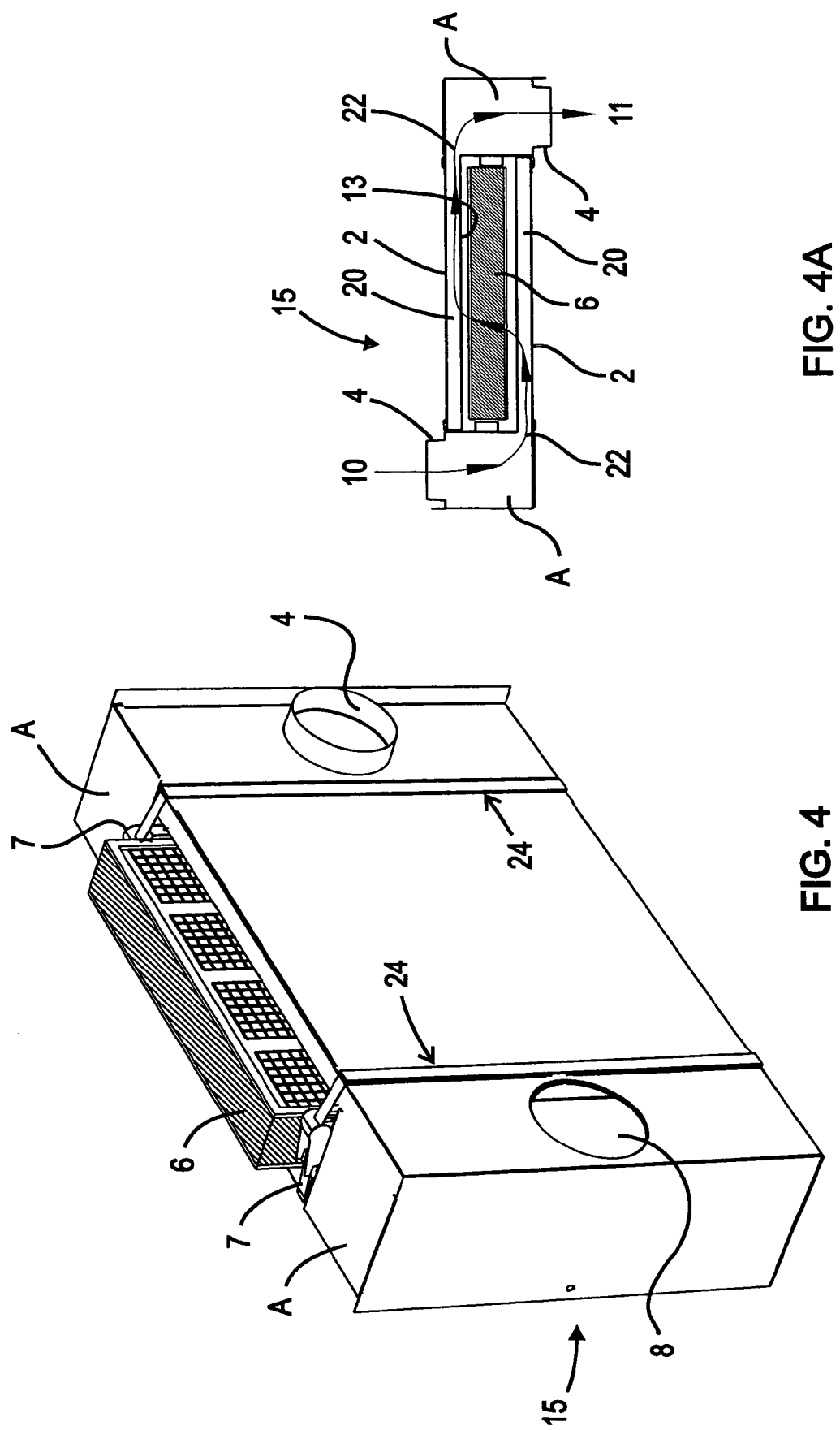
FIG. 4 is a perspective view of a filtration module including two identical and interchangeable housing members of FIGS. 3 and 3A connected together in a reverse, head-to-tail configuration, and a filter unit disposed in the module.
Figures 5, 5A:
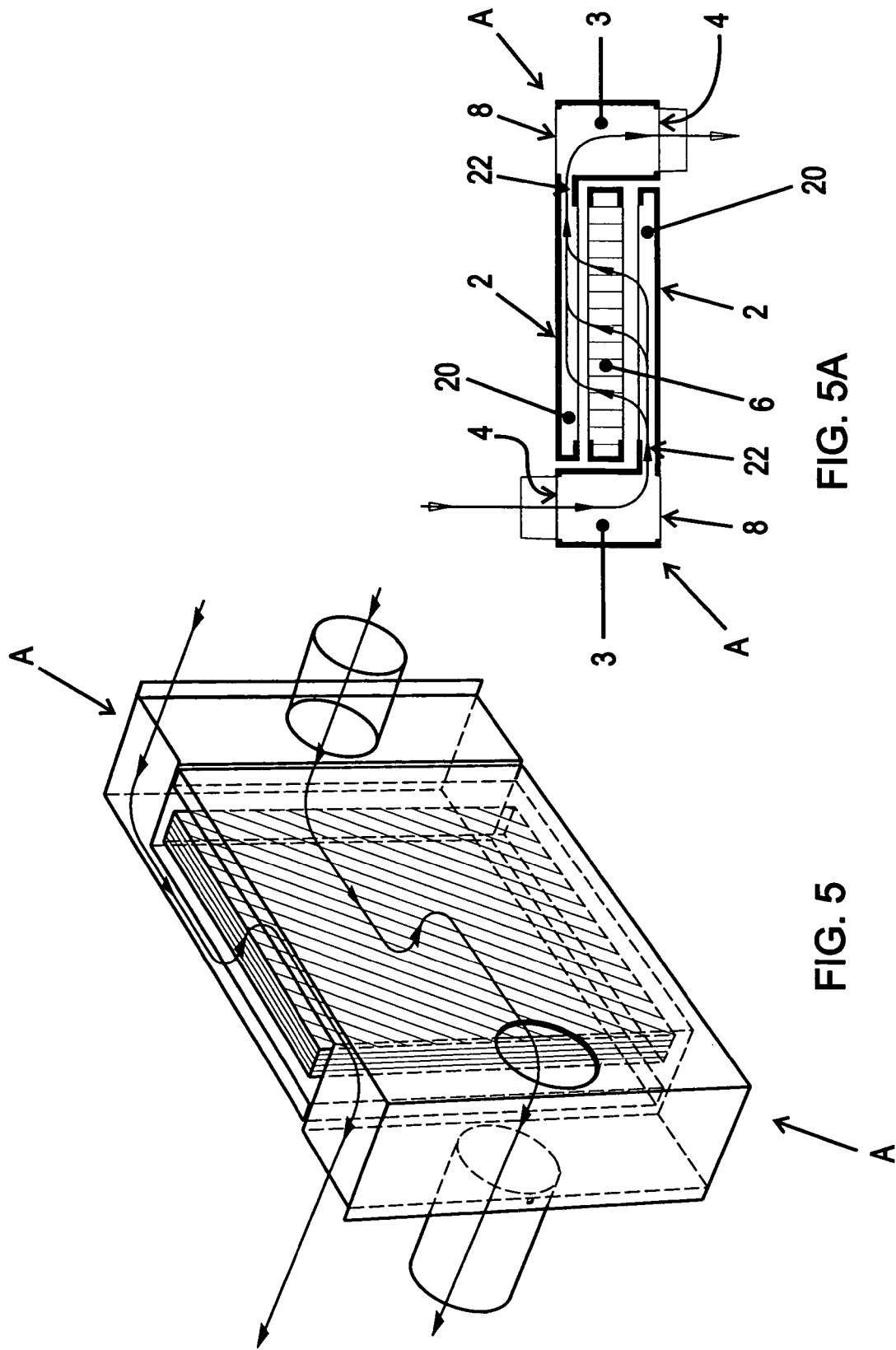
FIG. 5 is another perspective view of a filtration module including two identical and interchangeable housing members of FIGS. 3 and 3A connected together in a reverse, head-to-tail arrangement, and a filter unit disposed in the module.
FIG. 5A is a top plan view of the module and filter unit of FIG. 5.
Figure 6A:
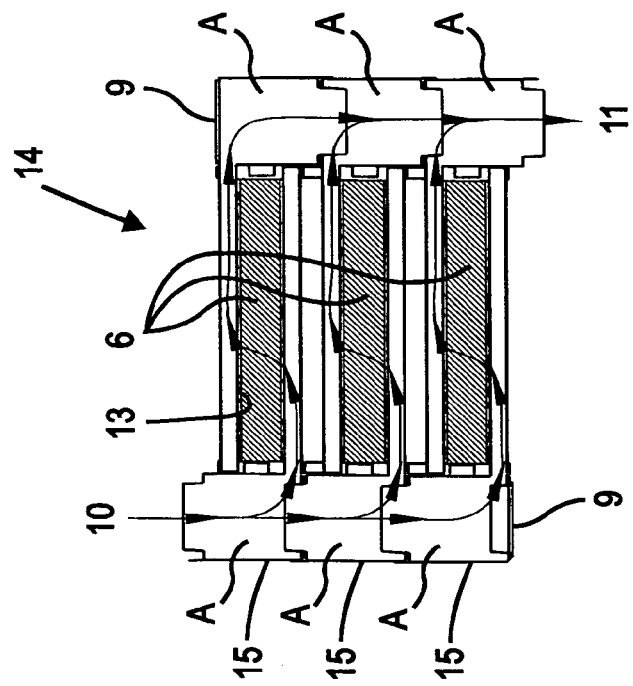
FIG. 6A is a top plan view of the assembly of FIG. 6.
Figure 6:
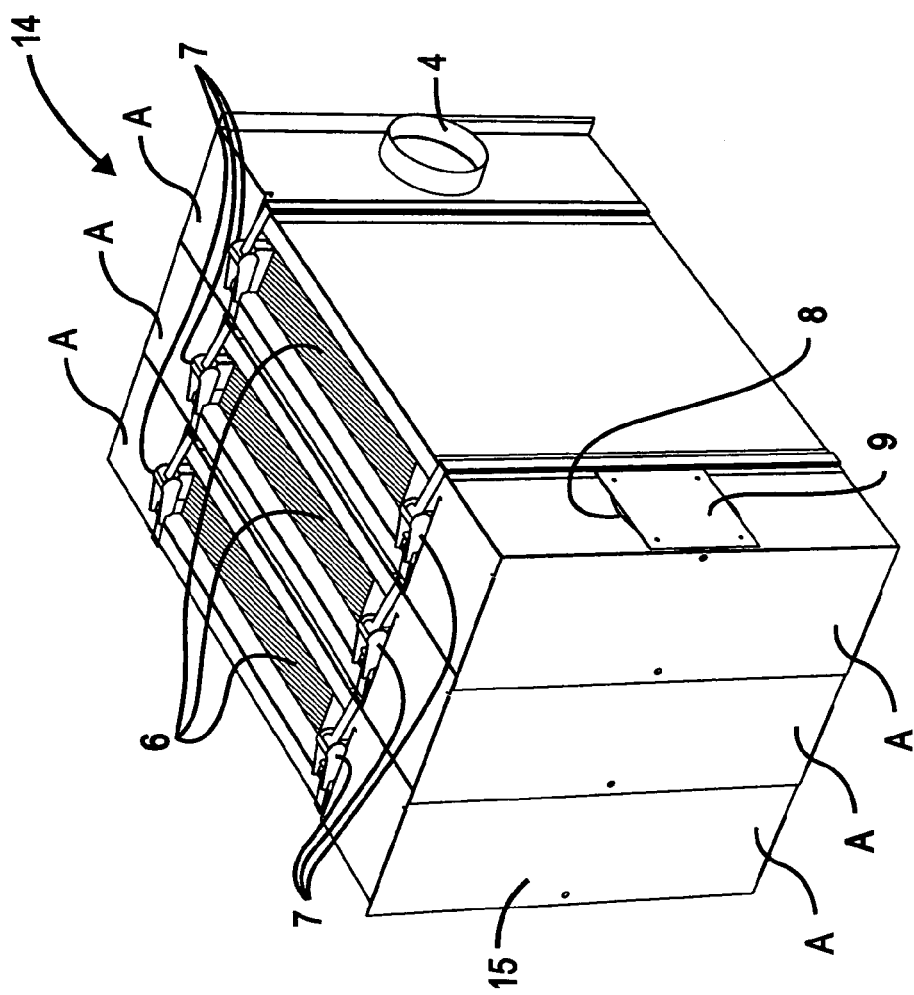
FIG. 6 is a perspective view of an assembly of a plurality of identical modules and filter units shown in FIGS. 4 and 4A.

Each of the housing members A is provided with a second opening 8 disposed in alignment with the first opening 4 of the housing member. As illustrated in FIGS. 4A, 5A and 6A, the first openings 4 may serve as inlets 10 or outlets 11 and, as illustrated in FIG. 6A, are engageable with second openings 8 of adjacent housing members. In an assembly 14 (FIGS. 6 and 6A) comprising multiple filtration modules 15, exposed and unused second openings 8 may be covered with a cover plate 9, such that a complete assembly comprising a plurality of filtration modules 15 includes a single inlet 10 and a single outlet 11, with a plurality of essentially parallel paths therebetween.

Significantly, and looking now at FIG. 6A, for an assembly comprising a plurality of filtration modules 15, by blocking off the exposed second opening 8 with plate 9, air entering inlet 10 of an end filtration module 15 will pass into a series of collection chambers 3 and be forced, in a parallel fashion, through a plurality of filters 6, and then be collected by the series of downstream collection chambers 3 for discharge through the single outlet 11. Thus, while such an assembly 14 may appear at first view to be a plurality of filter units arranged in series (and with the attendant advantages of economy of space), it actually operates as a plurality of filters arranged in parallel. This is a significant design advantage.

Figure 7:
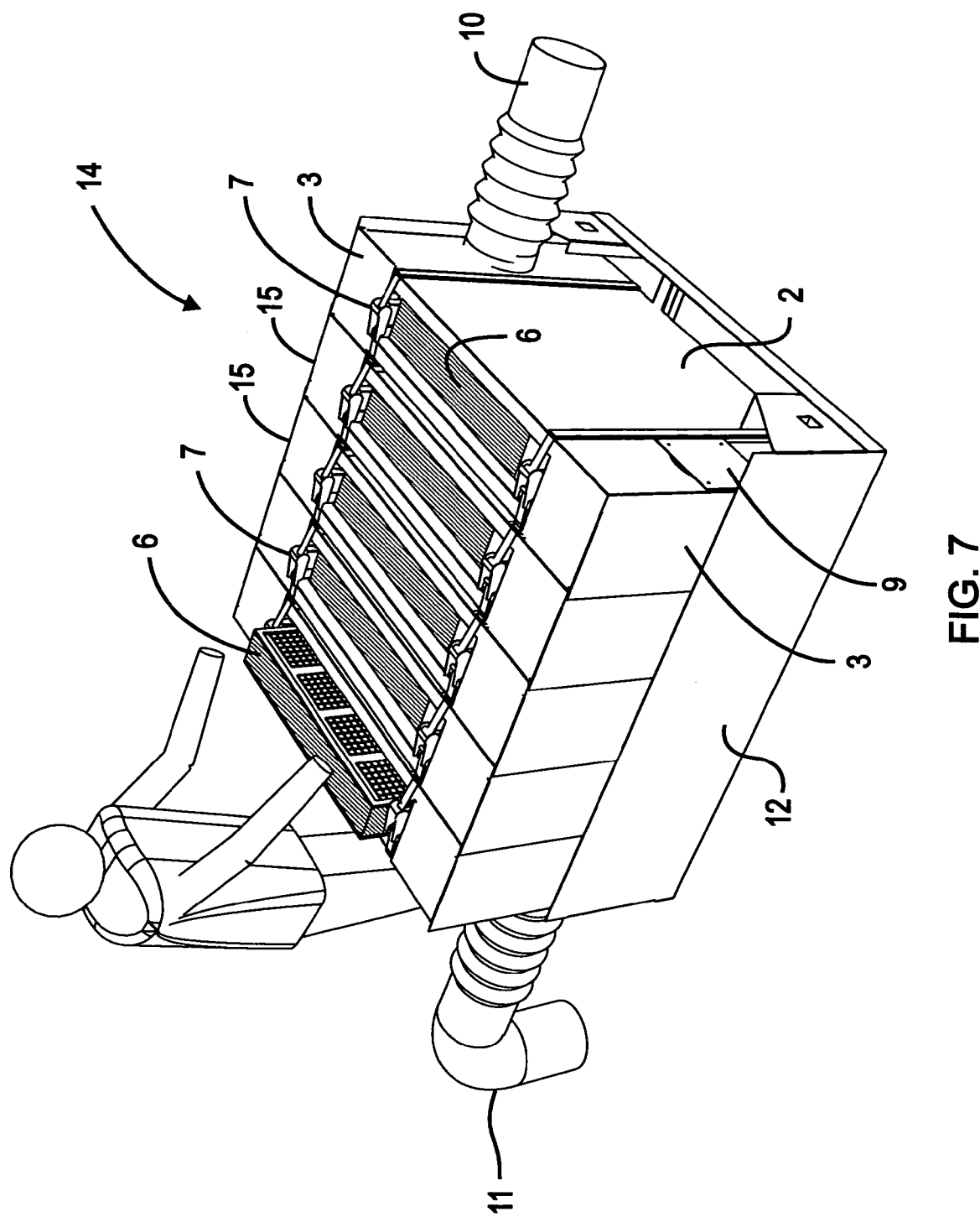
FIG. 7 is a perspective view of a further assembly disposed in a cradle and having an assembly inlet and an assembly outlet.
Figure 8:
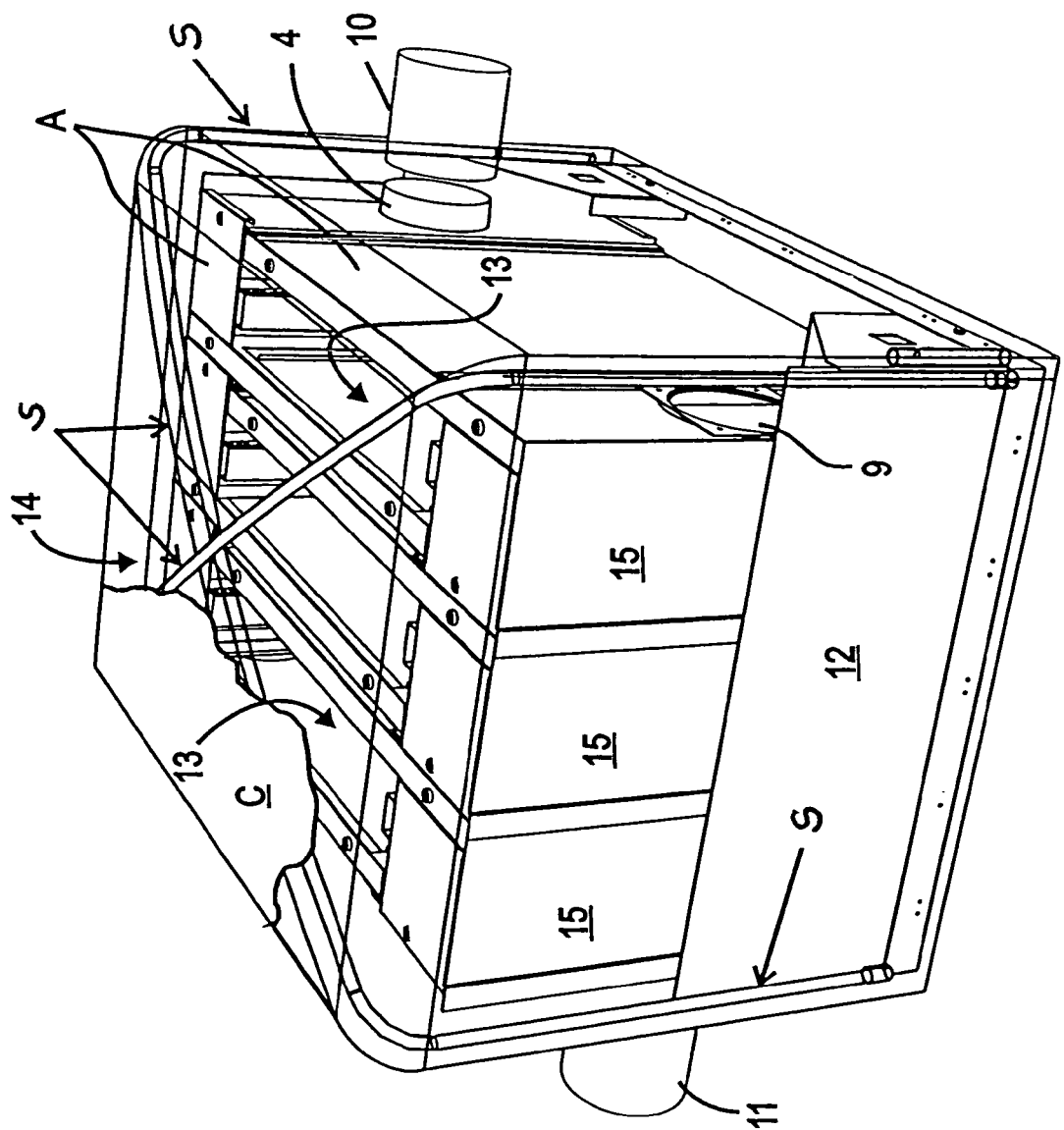
FIG. 8 is a perspective view of an assembly of modules on a cradle covered for use.

As may be seen in FIGS. 7 and 8, the assembly 14 of modules 15 may be placed in a cradle 12, with or without the filter units 6.

In operation, two identical L-shaped housing members A are connected together to form a filtration module 15 having the recess 13, which is adapted to receive one or more of the filter units 6, which may be held together by various tightening devices such as, for example, straps 24 equipped with the clamp devices 7. Springs 5 separate the elements when clamps 7 are released. Each pair of housing members A, configured as shown in FIGS. 4 and 4A, i.e., in inverse, head-to-tail configuration, comprise a filtration module 15, the housing members A being interlocked one into the other, forming the filtration module 15 whose input 10 receives the fluids to be treated, and whose output 11 discharges the treated fluids after being treated by the filter units 6. As shown in FIG. 6A, a plurality of the modules 15 may be connected together, by way of interfitting of the first openings 4 and the second openings 8, to form a complete, multi-module assembly 14. Where only one module 15 is to be used in the assembly 15, the second opening 8 of both housing members A are closed off, e.g., with plates 9; where multiple modules 15 are to be used in assembly 14, only the two exposed second openings 8 are closed off with plates 9, the remaining second openings 8 being used to provide fluid flow through the various modules 15.

Figure 3A:
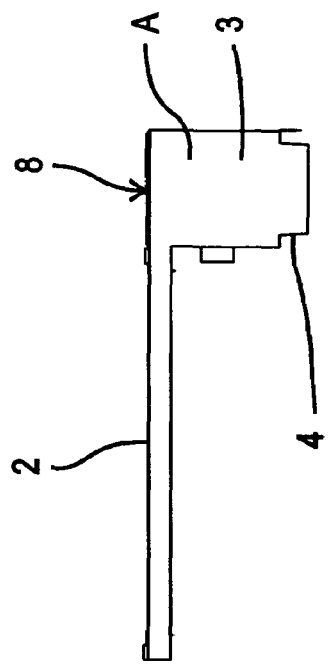
FIG. 3A is a top plan view of the housing member of FIG. 3.
Figure 3:
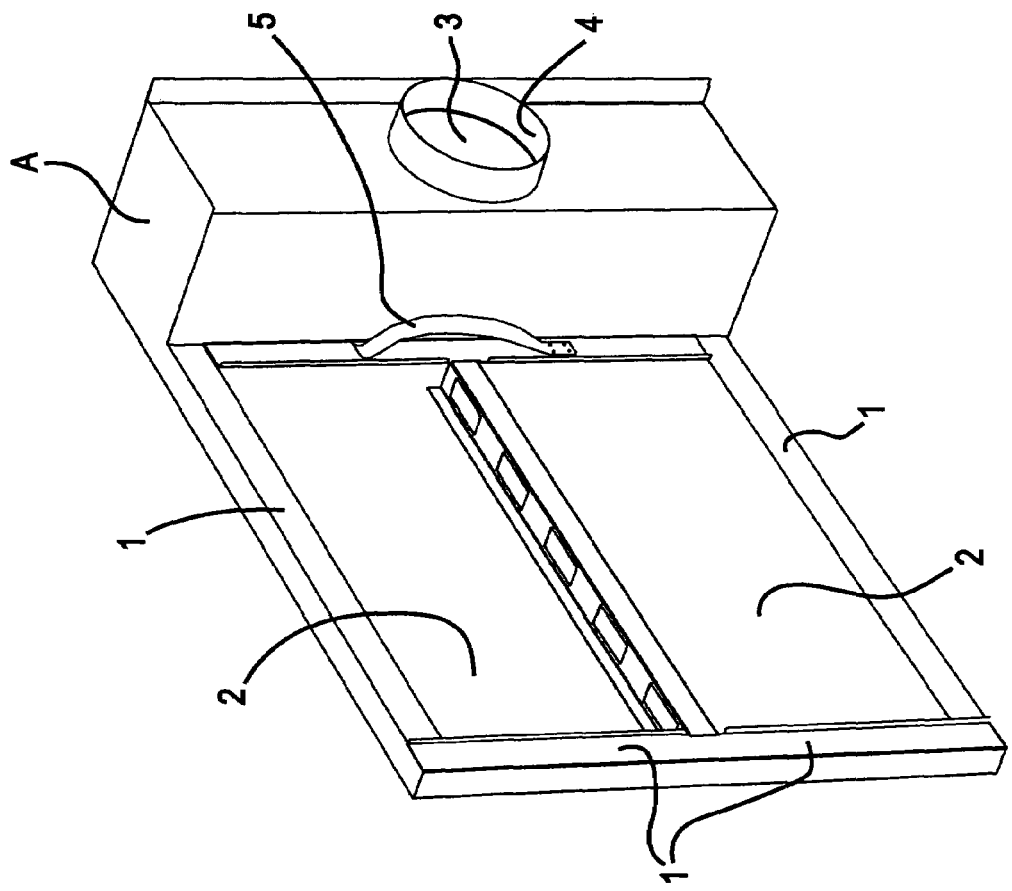
FIG. 3 is a perspective view of a housing member.

In FIG. 7, there is depicted an example of a filtration assembly 14 made up of five modules 15 which themselves are each made up of two identical housing members A of the type shown in FIG. 3. The number of modules 15 is selected according to the filtration task at hand. The cradle 12 is designed to receive the modules.

In FIG. 8 there is illustrated an assembly 14 of three modules 15 mounted in a cradle 12 and prepared for use. The number of modules in the assembly can be selected according to the filtration requirements of the user. If desired, the cradle 12 can be provided with a support structure S for supporting a coverlet C (only a portion of which is shown in FIG. 8), whereby to shield the assembly 14 from the environment (e.g., rain, snow, etc.). Significantly, the use of the support structure S and coverlet C provides an inexpensive, easy-to-erect shield which may be quickly and easily removed when desired to provide universal access for unit maintenance, filter replacement and assembly reconfiguration.

Figure 9:
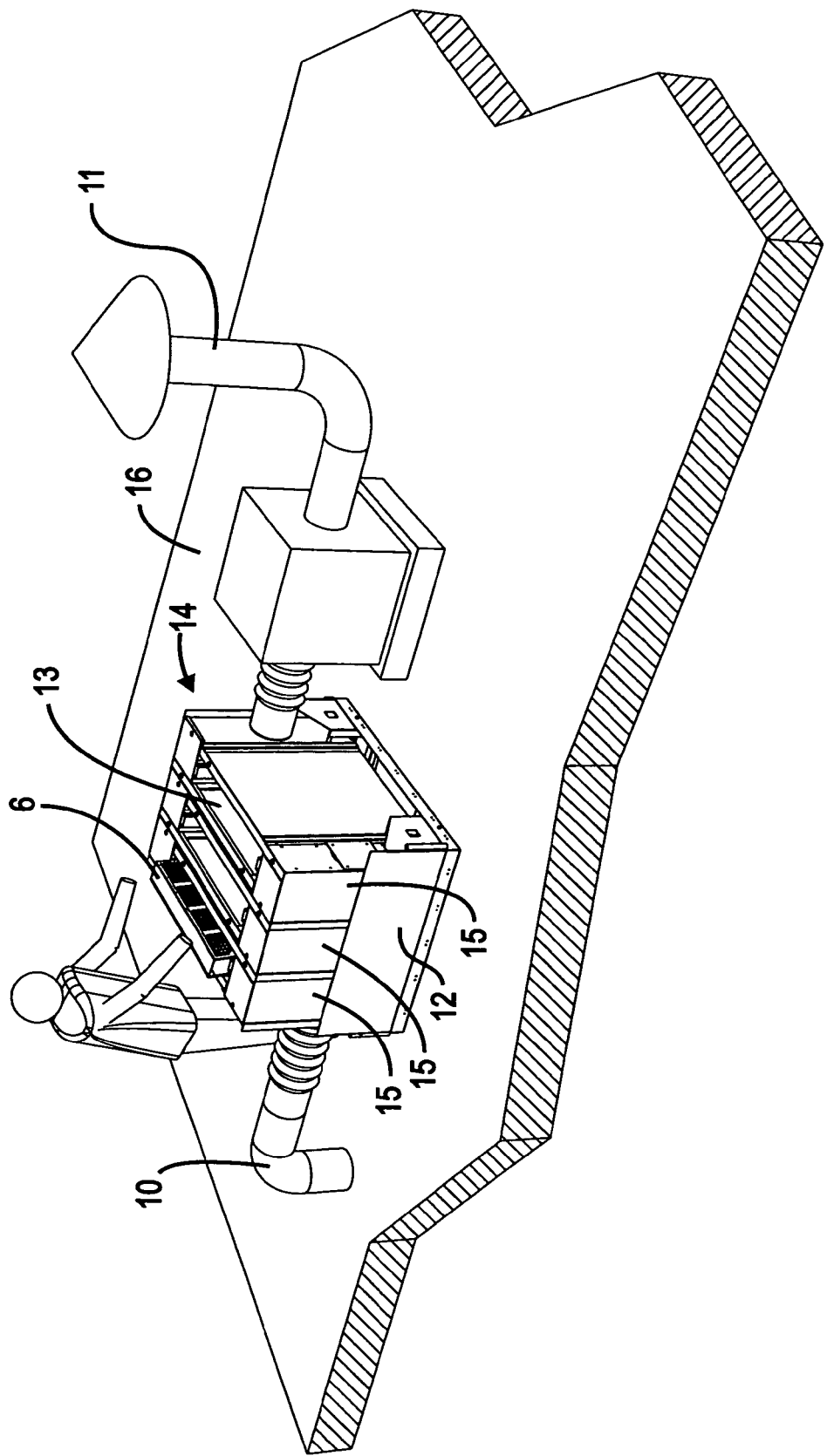
FIG. 9 is a perspective view of the assembly of FIG. 8 placed on a rooftop and being provided with filter units for filtration of a gaseous fluid.

The assembly 14 may be placed on a rooftop 16 (FIG. 9), or other selected location, and provided with appropriate filter units 6. In the assembly shown in FIG. 9, air enters the assembly by way of an inlet 10 leading from the interior of the building (not shown) underlying the rooftop 16, passes through three modules 15 simultaneously, and then on to an outlet 11 which serves as a vent to the atmosphere. Alternatively, the airflow may be in the opposite direction, i.e., it may enter the assembly through element 11, pass through the filtration assembly and then be introduced into the building through element 10. In each of the modules 15, the received fluid flows through one of the collection chambers, along one of the walls, through the filter unit, along the other of the walls, through the other of the collection chambers, and out of the module through the fluid outlet open to discharge fluid.

If the filtration capacity requirements change in time, the user need only add additional modules to, or remove modules from, the filtration assembly.

There is thus provided a filtration assembly of filtration modules for filtering fluids, gases or liquids, the assembly making available low-cost, mass production of filtration modules of reduced size, weight, maintenance and set-up, and which may easily be combined to provide a multi-filter assembly, with each filter module comprising a plurality of identical, L-shaped housing members connectable to one another in inverse, head-to-tail configuration, each module ensuring the inflow and outflow of fluid in each module and the intake and discharge of the fluids in the assembly.

It is to be understood that the present invention is by no means limited to the particular construction herein disclosed and/or shown in the drawings, but also comprises any modification or equivalent within the scope of the claims.

What is claimed is:

1. A fluid filtration assembly comprising a selected number of filtration modules, each of said modules comprising a planar filter unit and first and second housing members connected together to form an open-sided recess receiving said filter unit edge-wise of said filter unit, each of said housing members being provided with a collection chamber having first and second opening structures aligned with each other, and a wall portion extending outwardly from the chamber and defining one wall of the recess when said housing members are connected together, the one wall being spaced from said filter unit, wherein one of the first and second opening structures are each configured to serve as a fluid inlet, the walls permitting fluid flow therebetween and through said filter unit, the other of the first and second openings structures each being configured to serve as a fluid outlet;

wherein said filtration module housing members are of substantially L-shaped configuration and are connected to each other by interconnection of pairs of the opening structures in reversed, head-to-tail configuration, to form the recess which is configured to receive said filter unit to form one of the filtration modules; and said one filtration module is configured for connection to and release from at least one additional filtration module by interconnection of selected ones of the opening structures to change capacity of the filtration assembly.

2. The assembly in accordance with claim 1, wherein each of said housing members is provided with a spring mechanisms to assist in separation of said housing members from adjacent elements.

3. The assembly in accordance with claim 1 wherein said housing members are fitted with springs between which the filter units are slidably inserted.

4. The assembly in accordance with claim 1 wherein one of said housing members, when said housing members are assembled to form a filtration module, directs inflow of the fluid to be treated towards said filter unit, while the other of said housing members directs treated fluid to outside of said filtration module.

5. The assembly in accordance with claim 1 wherein each of said housing members is provided with one of said opening structures which collects inflow of fluid and a further of said opening structures which directs outflow of fluid, thus allowing input of fluids to be treated, and output of treated fluids, the capacity of the assembly depending upon the selected number of said filtration modules disposed in the assembly.

6. The assembly in accordance with claim 1 wherein output of fluids treated is rendered variable by selection of the number of said filtration modules in the assembly, the number being changeable by at least one filtration module by addition to and removal thereof from the assembly.

7. A fluid filtration assembly comprising:

a selected number of filtration modules, each one of said modules comprising:

a planar filter unit;

a first housing member comprising a first collection chamber in communication with a first wall extending therefrom, said first housing member having a first fluid inlet structure and a first fluid outlet structure, respectively, in opposed walls of said first collection chamber and in alignment with each other;

a second housing member comprising a second collection chamber in communication with a second wall extending therefrom, said second housing member having a second fluid inlet structure and a second fluid outlet structure, respectively, in opposed walls of said second collection chamber and in alignment with each other;

said first and second collection chambers and the first and second walls defining an open-sided recess slidably receiving and retaining said a filter unit edge-wise of said filter unit;

wherein one of the fluid inlets structures is open to receive fluid flow and one of the fluid outlets structures is open to discharge filtered fluid, wherein the received fluid flows through one of said collection chambers, along one of the walls, through the filter unit, along the other of the walls, through the other of said collection chambers, and out of the module through the fluid outlet structure to discharge fluid; and wherein said first and second housing members are of a substantially L-shaped configuration and are connected together in inverse, head-to-tail configuration by interconnection of selected ones of the fluid inlet and fluid outlet structures, to form the recess, said housing members being connected to each other with said first collection chamber of said first housing member adjacent a free end of the second wall, and said second collection chamber of said second housing member adjacent a free end of the first wall; and said filtration module is connectable to and separable from other of said number of filtration modules, by interconnection of selected ones of the fluid inlet and fluid outlet structures to selectively increase and decrease filtration capacity of said assembly.

8. The assembly in accordance with claim 1 wherein the at least one additional filtration module is of construction substantially identical to another of said filtration modules and is connectable thereto and separable therefrom without relocation of said assembly.

9. The assembly in accordance with claim 8, wherein all of the filtration modules are connectable to each other.

10. The assembly in accordance with claim 9 wherein the fluid inlet structures and outlet structures are complementarily engageable with each other to form segments of a continuous flow path.

11. The fluid filtration assembly in accordance with claim 1 wherein addition of a filtration module to the one filtration module and removal of a filtration module from a plurality of filtration modules renders the assembly adaptable to changing filtration needs in situ.

12. The fluid filtration assembly in accordance with claim 1 wherein all of the housing members are substantially identical to each other, and said filter units are identical to each other, and said filtration modules are substantially identical to each other, such that said assembly is adapted for economical production.

13. The fluid filtration assembly in accordance with claim 1 wherein said filtration modules are adapted for interconnection and disposition side-by-side with a bottom edge of each of said filtration modules being proximate a horizontal surface, such that said assembly is adapted to extend across a generally planar horizontal mounting surface so as to distribute weight of the assembly over an area of the surface occupied by the bottom edges of the filtration modules.

14. The fluid filtration assembly in accordance with claim 1 wherein said filtration modules are separable from each other, and said filter units are separable from said filtration modules and from said housing members, and said housing members are separable from each other, to enable easy relocation of said assembly, and easy access to selected parts of the assembly for maintenance, repair, and replacement of components.

15. A fluid filtration assembly, the assembly comprising:
a selected number of filtration modules;
each of said modules comprising first and second housing members connected together to form an open-sided recess;
a filter unit slidably inserted into the recess; and a
spring fixed to at least one of said housing members and engaged with said filter unit to retain said filter unit in the recess;
wherein said housing members are of an L-shaped configuration and are connected to each other to form the recess therebetween; and
first and second openings disposed in each housing member, each of said openings being configured to serve as a selected one of a fluid inlet and a fluid outlet, and each of said openings being telescopically engaged with an opening of another housing member to fasten the housing members together; and
said filtration modules are each configured for connection, by interconnection of selected ones of the openings, to a further filtration module to form an assembly of a plurality of said filtration modules;
wherein said filtration modules are configured to be disposed side-by-side on a supporting surface;
wherein said housing members are substantially identical; and wherein said filter units are substantially identical.

16. The assembly in accordance with claim 10 wherein one of the complimentarily engageable fluid inlet structures and outlet structures comprises an orifice, and the other of the complimentarily engageable inlet structures and outlet structures comprises a tubular sleeve receivable by the orifice.

\* \* \* \* \*